US011763313B2

(12) United States Patent
Mullaney et al.

(10) Patent No.: US 11,763,313 B2
(45) Date of Patent: Sep. 19, 2023

(54) SYSTEMS AND METHODS FOR ISSUER-SPECIFIED DOMAIN CONTROLS ON A PAYMENT INSTRUMENT

(71) Applicant: JPMorgan Chase Bank, N.A., New York, NY (US)

(72) Inventors: Craig M. Mullaney, Newark, DE (US); Howard Spector, Street, MD (US); Scott H. Ouellette, Kingston, NH (US); Tuan Dao, Richardson, TX (US); David G. Seeney, Wilmington, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/055,277

(22) Filed: Nov. 14, 2022

(65) Prior Publication Data

US 2023/0076359 A1    Mar. 9, 2023

Related U.S. Application Data

(62) Division of application No. 16/275,581, filed on Feb. 14, 2019, now Pat. No. 11,501,306.

(Continued)

(51) Int. Cl.
*G06Q 20/40*      (2012.01)
*G06Q 20/38*      (2012.01)

(52) U.S. Cl.
CPC ......... *G06Q 20/405* (2013.01); *G06Q 20/385* (2013.01)

(58) Field of Classification Search
None
See application file for complete search history.

(56) References Cited

U.S. PATENT DOCUMENTS

2010/0235284 A1    9/2010  Moore
2012/0095852 A1*   4/2012  Bauer ............... G06Q 20/3223
                                                           705/16

(Continued)

OTHER PUBLICATIONS

International Search Report and Written Opinion of the International Searching Authority, dated Apr. 30, 2019, from corresponding International Application No. PCT/US2019/017923.

(Continued)

*Primary Examiner* — Mike Anderson
*Assistant Examiner* — Matthew Cobb
(74) *Attorney, Agent, or Firm* — GREENBERG TRAURIG LLP

(57) ABSTRACT

Systems and methods for issuer-specified domain control on a payment instrument are disclosed. In one embodiment, in an information processing apparatus comprising at least one computer processor, a method for issuer-specified domain controls on a payment instrument may include: (1) receiving, from an issuer of a financial instrument, an identification of a domain control or restriction on a payment token for the financial instrument, the domain control or restriction to be applied by the issuer; (2) requesting generation of the payment token with a pass-through indicator from a token service provider; (3) receiving, from the token service provider, the payment token; and (4) storing an association of the domain control or restriction and the payment token.

13 Claims, 3 Drawing Sheets

Related U.S. Application Data

(60) Provisional application No. 62/630,505, filed on Feb. 14, 2018.

(56) References Cited

U.S. PATENT DOCUMENTS

| | | |
|---|---|---|
| 2013/0124346 A1 | 5/2013 | Baldwin et al. |
| 2013/0282588 A1* | 10/2013 | Hruska ................. G06Q 20/40 |
| | | 705/67 |
| 2015/0127547 A1 | 5/2015 | Powell et al. |
| 2015/0319158 A1* | 11/2015 | Kumnick ............... H04L 67/02 |
| | | 726/9 |
| 2016/0173483 A1 | 6/2016 | Wong et al. |
| 2016/0217459 A1* | 7/2016 | Lindner ............... G06Q 20/367 |
| 2016/0267467 A1 | 9/2016 | Rutherford et al. |
| 2017/0255932 A1* | 9/2017 | Aabye .................... H04L 63/06 |
| 2018/0006821 A1 | 1/2018 | Kinagi |
| 2018/0232728 A1* | 8/2018 | Dooley ................ G06Q 20/385 |
| 2018/0309677 A1 | 10/2018 | Spatscheck et al. |
| 2019/0081784 A1 | 3/2019 | Carey |
| 2019/0197616 A1* | 6/2019 | Dogin ................ G06Q 20/4016 |

OTHER PUBLICATIONS

Extended European Search Report, dated Oct. 13, 2021, from corresponding European Patent Application No. 19754288.9.

* cited by examiner

SYSTEMS AND METHODS FOR ISSUER-SPECIFIED DOMAIN CONTROLS ON A PAYMENT INSTRUMENT

RELATED APPLICATIONS

This application is a Divisional of U.S. patent application Ser. No. 16/275,581, now U.S. Pat. No. 11,501,306, which claims the benefit of U.S. Provisional Patent Application Ser. No. 62/630,505, filed Feb. 14, 2018, the disclosure of each of which is hereby incorporated, by reference, in its entirety.

BACKGROUND OF THE INVENTION

1. Field of the Invention

The present disclosure generally relates to systems and methods for issuer-specified domain control on a payment instrument.

2. Description of the Related Art

Token service providers, such as Visa, often include domain restrictions or controls on the tokens that they generate in order to reduce or eliminate fraud. For example, a token provisioned for Apple Pay may be restricted to Apple Pay-enabled devices. As another example, a token provisioned for one merchant may not be able to be used with another merchant. A financial instrument issuer, however, may wish to specify which domain restrictions or controls are used, if any, when requesting the token from the token provider. For example, an issuer may not want the payment network to use any domain restrictions or controls on the transaction, and may instead apply its own restrictions or controls on the transaction.

SUMMARY OF THE INVENTION

Systems and methods for issuer-specified domain control on a payment instrument are disclosed. In one embodiment, in an information processing apparatus comprising at least one computer processor, a method for issuer-specified domain controls on a payment instrument may include: (1) receiving, from an issuer of a financial instrument, an identification of a domain control or restriction on a payment token for the financial instrument, the domain control or restriction to be applied by the issuer; (2) requesting generation of the payment token with a pass-through indicator from a token service provider; (3) receiving, from the token service provider, the payment token; and (4) storing an association of the domain control or restriction and the payment token.

In one embodiment, the pass-through indicator may include a bank identification number, a cryptogram parameter for the payment token, etc.

In one embodiment, the token service provider may not be associated with a payment network.

In one embodiment, the domain control or restriction may be applied by the issuer.

In one embodiment, the domain control or restriction may be dynamic.

In one embodiment, the domain control or restriction may control use of the payment token with a certain merchant, with a certain device, in a certain environment, at a certain time, in a certain geography, or at a certain authentication level.

In another embodiment, in an information processing apparatus comprising at least one computer processor, a method for processing a transaction using issuer-specified domain controls may include: (1) receiving, from a payment network, a transaction comprising a payment token, the payment token comprising a pass-through indicator; (2) retrieving a domain control or restriction associated with the payment token; and (3) applying the control or restriction to the transaction.

In one embodiment, the pass-through indicator may be a bank identification number, a cryptogram parameter for the payment token, etc.

In one embodiment, the domain control or restriction may control use of the payment token with a certain merchant, with a certain device, in a certain environment, at a certain time, in a certain geography, or at a certain authentication level.

In one embodiment, the domain control or restriction may be dynamic.

In one embodiment, the domain control or restriction may be stored in a database.

In one embodiment, the method may further include updating the domain control or restriction stored in the database.

In one embodiment, the payment network may apply a payment-network level domain control or restriction on the transaction.

According to another embodiment, a system for processing a transaction using issuer-specified domain controls may include an issuer of a financial instrument system; a payment network; and a token service provider system. The payment network may receive a transaction comprising a payment token, the payment token comprising a pass-through indicator and may pass the transaction to the issuer. The issuer system may receive a domain control or restriction associated with the payment token and may apply the control or restriction to the transaction.

In one embodiment, the pass-through indicator may be a bank identification number, a cryptogram parameter for the payment token, etc.

In one embodiment, the domain control or restriction may control use of the payment token with a certain merchant, with a certain device, in a certain environment, at a certain time, in a certain geography, or at a certain authentication level.

In one embodiment, the payment network may apply a payment-network level domain control or restriction on the transaction before passing the transaction to the issuer.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are directed to systems and methods for issuer-specified domain controls on a payment instrument.

In embodiments, as part of the token request process, the financial instrument issuer may specify the controls or restrictions, if any, on a token, such as a payment token. The token service provider may then generate and/or issue a token in accordance with the token request. In one embodiment, the token service provider may associate the controls or restrictions, or a lack thereof, for the token based on the bank identification number, or BIN, for the token. Thus, when a transaction is conducted using the token, the payment network may execute the restriction(s) or control(s) associated with the BIN.

In another embodiment, the token service provider may associate the restrictions or controls, if any, with the token, and may store the association in the token service provider's token vault. Thus, when a transaction is conducted using the token, the payment network may retrieve the control(s) or restriction(s), if any, from the token service provider's token vault, and execute the restriction(s) or control(s) that are retrieved.

In another embodiment, tokens generated by a third party may be used. Because these tokens are not generated by the token service provider, the payment network may ignore the tokens and allow them to pass through the payment network to the issuer without any controls or restrictions being executed.

In another embodiment, a unique cryptogram may be used to identify the restrictions or controls. For example, the unique cryptogram may be attached to, or associated with, a token, and may identify or reference one or more control or restriction associated with the token. Any suitable cryptogram may be used. An example of a cryptogram that may be used is provided in U.S. Patent Application Ser. No. 62/552,506, the disclosure of which is hereby incorporated, by reference, in its entirety.

In embodiments, a combination of any of the above may be used as is necessary and/or desired.

In one embodiment, once the tokens pass through the payment network to the issuer, the issuer may impose its own controls or restrictions on the tokens, which may be based on any of the above techniques, or any other techniques as is necessary and/or desired. Additional techniques, such as internally mapping the token to one or more controls or restrictions, may also be used as is necessary and or desired.

In one embodiment, both the payment network and the issuer may apply controls or restrictions. For example, the payment network may apply coarsely-grained controls or restrictions (e.g., verify that a token provisioned for Apple-Pay was received from an ApplePay-enabled device), and the issuer may apply finely-grained controls or restrictions (e.g., only permit transaction if it does not exceed a certain amount).

Figure 1:
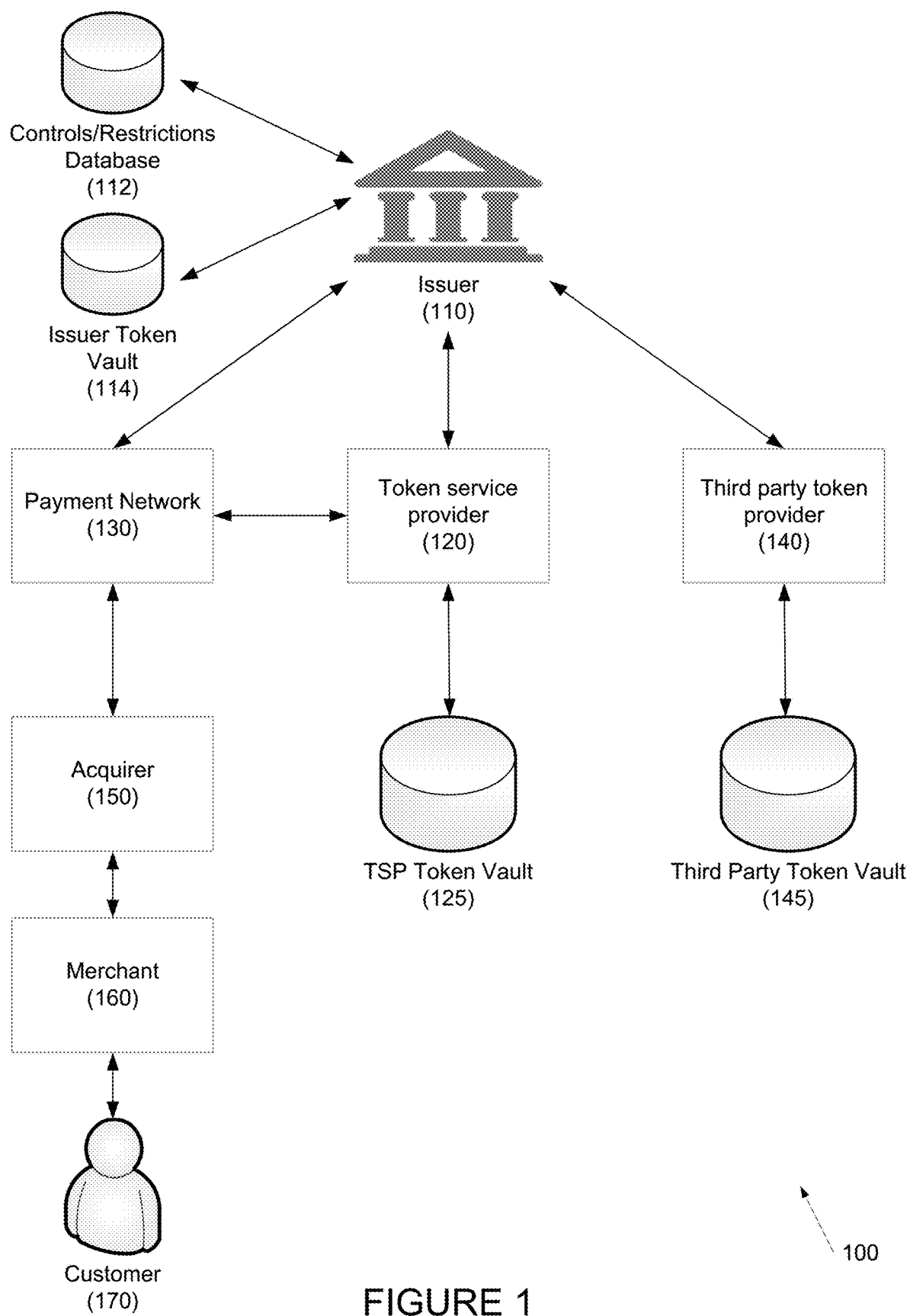
FIG. 1 depicts a system for issuer-specified domain control on a payment instrument according to one embodiment.

Referring to FIG. 1, a system for issuer-specified domain control on a payment instrument is disclosed according to one embodiment. System 100 may include issuer 110 that may issue a financial instrument (e.g., a credit card, debit card, etc.) to customer 170. Issuer 110 may be a financial institution, a financial technology services provider, etc.

Issuer 110 may receive transactions from merchant 160 via acquirer 150 and payment network 130. Issuer 110 may further interact with token service provider 120, which may manage payment tokens and store the tokens in TSP token vault 125. In one embodiment, token service provider 120 may be affiliated with payment network 130 such that payment network 130 may take one or more actions, such as executing a control or restriction, based on tokens issued or managed by token service provider 120.

Issuer 110 may also interact with third party token provider 140. Third party token provider 140 may provide tokens for issuer 110 and may store its tokens in third party token vault 145. In one embodiment, payment network 130 and third party token vault may not have any association; thus, the actions that payment network 130 may take with third party token provider 140's tokens may be limited or non-existent.

In one embodiment, a cryptogram lockbox (not shown) may be used to generate cryptograms locally at merchant 160. Examples of cryptogram lockbox systems and methods are disclosed in U.S. Patent Application Publication No. 62/680,674, the disclosure of which is hereby incorporated, by reference, in its entirety.

The cryptogram lockbox may generate cryptograms or other parameters that may be used to indicate domain controls or restrictions. In one embodiment, the owner of the lockbox (e.g., issuer 110) may modify the parameters, directly or remotely, to change how the domain controls or restrictions are applied.

In one embodiment, issuer 110 may host controls/restrictions database 112 that may store an association between the token and the controls or restrictions that are to be applied by issuer 110. Issuer 110 may further host issuer token vault 114 that may store an association between the token and the related financial instrument.

In one embodiment, two or more of issuer token vault 114, TSP token vault 125, and third party token vault 145 may be synchronized. Examples of systems and methods for synchronizing two or more of these token vault are disclosed in U.S. patent application Ser. No. 16/010,766, U.S. Provisional Patent Application Ser. No. 62/556,530, and U.S. patent application Ser. No. 16/126,201, the disclosure of each of which is hereby incorporated by reference in its entirety.

Figure 2:
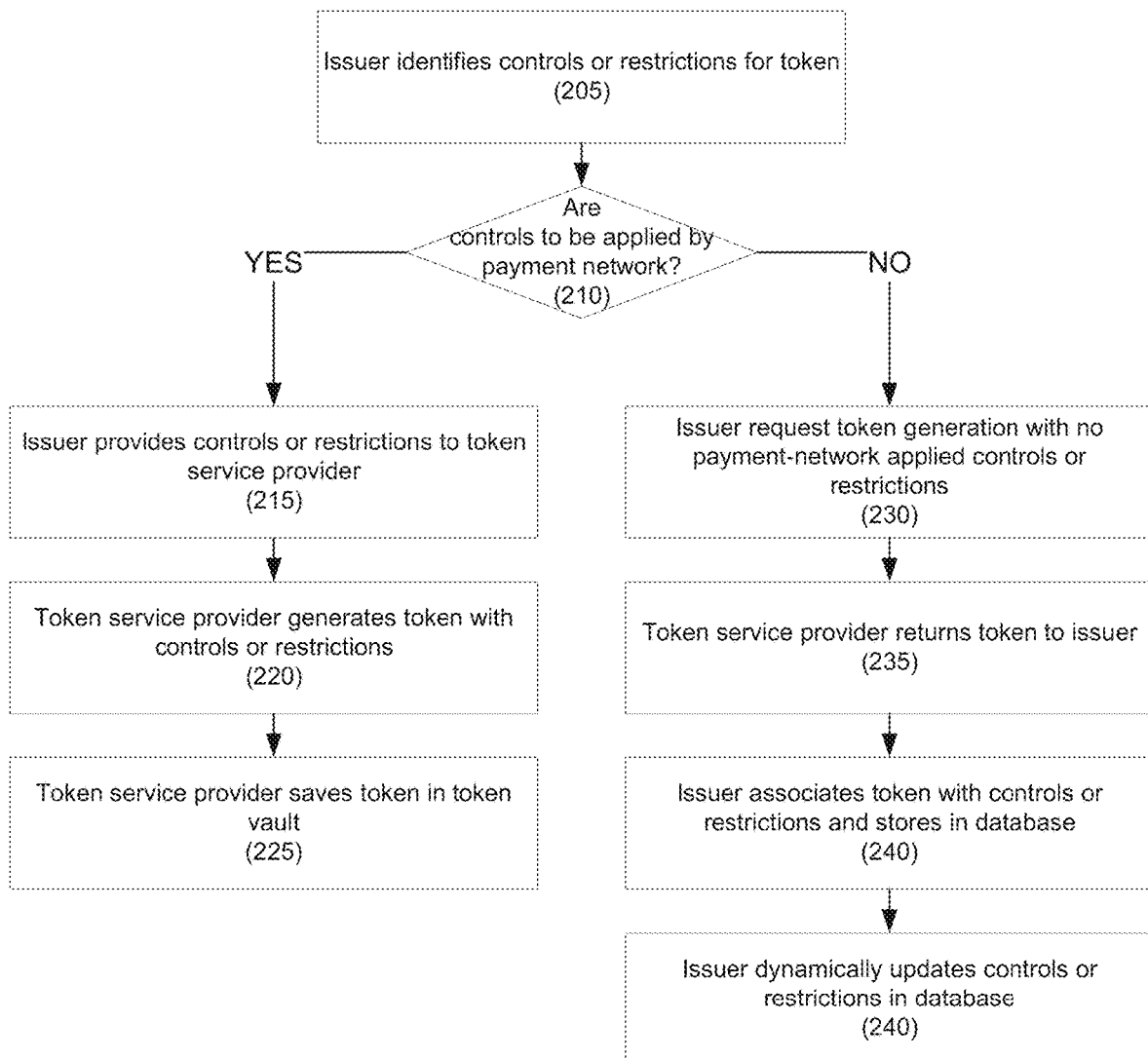
FIG. 2 depicts a method for token creation with issuer-specified domain controls according to one embodiment.

Referring to FIG. 2, a method for token creation with issuer-specified domain controls is disclosed according to one embodiment. In step 205, an issuer may identify controls or restrictions to be placed on a token. In one embodiment, the controls or restrictions may be domain restrictions that may prevent the token from being used with certain merchants, certain devices (e.g., smartphone, no ATMs, etc.), in certain environments (e.g., online only, in-person only, etc.), at certain times, in certain geographies, with a certain level of authentication, below a certain amount, token use velocity (e.g., limited number of uses) etc. In one embodiment, the controls or restrictions may be dynamic in that they may vary and change over the course of time.

In step 210, the issuer may have the controls or restrictions applied by the payment network, or may have the payment network pass the transaction through to the issuer. If the payment network is to apply the controls or restrictions, in step 215, the issuer may provide the controls or restrictions to the token service provider. In one embodiment, the issuer may provide a bank identification number (BIN) or BIN range for the token that may indicate such.

In another embodiment, the issuer may identify a flag, indicator, field, a cryptogram parameter, etc. that may be included in or associated with the token for indicating that the payment network is to apply the controls or restrictions.

In one embodiment, rules may be provided to be enforced against the cryptogram for the token, such as how long the cryptogram is valid, how many times the cryptogram may be used, if the cryptogram is required, etc. In one embodiment, the rules may be managed by the token service provider and/or the issuer, and may be enforced by the payment network and/or the issuer.

In step 220, the token service provider may generate a token having the controls or restrictions. In one embodiment, the token may be generated by generating a unique 15-digit number with the specified BIN (i.e., the first six digits), and calculating a check digit for the sixteenth digit.

In step 225, the token service provider may store the token with the controls or restrictions in the token service provider's token vault.

If, in step 210, the payment network is to pass a transaction involving the token through to the issuer without applying controls or restrictions, in step 230, the issuer may request that the token service provider generate a token. The issuer may provide the token service provider with an indication that the payment network is to pass the transaction through to the issuer without applying controls or restrictions. In one embodiment, the issuer may provide a BIN or BIN range for the token that may indicate such.

In another embodiment, the issuer may identify a flag, indicator, field, a cryptogram parameter, etc. that may be included in or associated with the token for indicating that the payment network is to pass the transaction to the issuer without applying controls or restrictions.

In one embodiment, rules may be provided to be enforced against the cryptogram for the token, such as how long the cryptogram is valid, how many times the cryptogram may be used, if the cryptogram is required, etc. In one embodiment, the rules may be managed by the token service provider and/or the issuer, and may be enforced by the payment network and/or the issuer.

In step 235, the token service provider may generate a token having the specified BIN, as described above, and may return the token to the issuer. In one embodiment, the token service provider may generate the token with an indication that the payment network is to pass the transaction to the issuer without the payment network taking action. In another embodiment, the BIN may indicate that the token is to pass to the issuer without the payment network taking action.

In one embodiment, instead of the token service provider, a third party token provider may generate the token for the issuer, and may return the token to the issuer. In one embodiment, the third party token provider may store the token and a cross-reference to the real account number in its token vault. The third party token provider may also manage the controls or restriction(s), and may return a decision to the issuing system.

The third party token provider may perform any desired combination of these and other functions.

In step 240, the issuer may associate the token with the controls or restrictions and may store the association in a database.

In step 245, the issuer may add, modify, or delete controls or restrictions for the token. For example, the controls or restrictions may be dynamic, in that the issuer may enable, disable, add, delete, or modify the controls or restrictions as is necessary and/or desired. In one embodiment, the controls or restrictions may be updated in the database.

Figure 3:
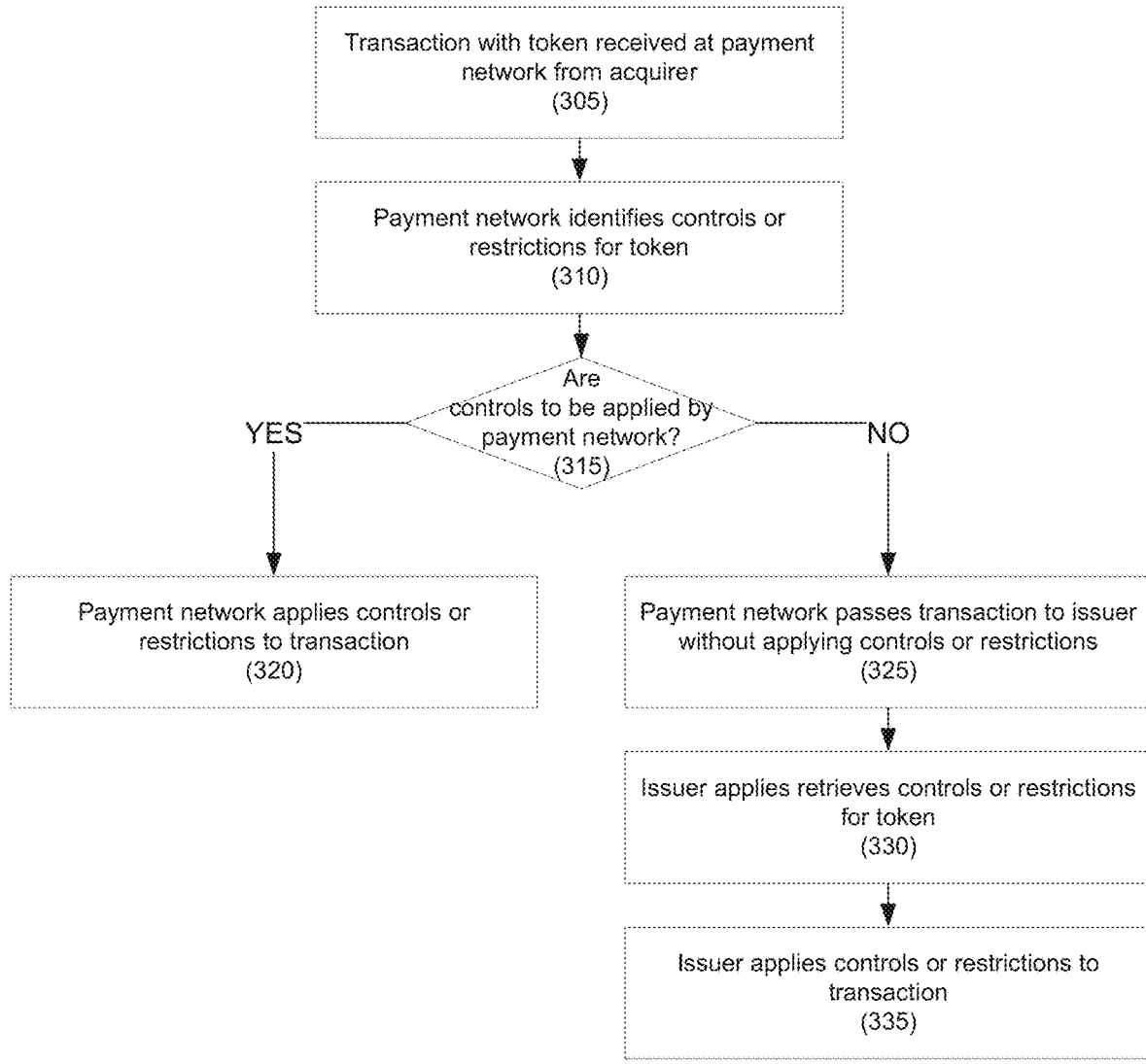
FIG. 3 depicts a method for processing a transaction using issuer-specified domain controls according to one embodiment.

Referring to FIG. 3, a method for processing a transaction using issuer-specified domain controls is disclosed according to one embodiment.

In step 305, a transaction between a merchant and customer may be received at a payment network via an acquirer. In one embodiment, the transaction may include a token.

In step 310, the payment network may identify any restrictions or controls on the use of the token. In one embodiment, the payment network may identify these controls or restriction based on the BIN, based on the cryptogram, based on an indicator in the token, a field in or associated with the token, a combination thereof, etc.

In one embodiment, the payment network may retrieve the controls or restrictions from a token vault.

In one embodiment, an indicator in or associated with the token (e.g., the BIN, cryptogram, indicator, field, etc.) may specify that the payment network is to pass the transaction to the issuer without applying any controls or restrictions.

In step 315, if controls or restriction are to be applied by the payment network, in step 320, the payment network may apply the controls or restrictions to the transaction.

In step 325, if controls or restriction are not to be applied by the payment network, in step 325, the payment network may pass the transaction to the issuer without applying controls or restrictions to the transaction.

In step 330, the issuer may retrieve controls or restrictions for the token. In one embodiment, the issuer may retrieve the controls or restrictions from a database, or may retrieve controls or restrictions associated with the BIN.

In step 335, the issuer may apply the retrieved controls or restrictions to the transaction, and the transaction may be approved or denied.

It should be recognized that the embodiments disclosed herein are not exclusive to each other; features and elements from one embodiment may be used with others as is necessary and/or desired.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A system for processing a transaction using issuer-specified domain controls, comprising:
an issuer computer program executed by an issuer of a financial instrument;
a payment network;
an electronic device executing an electronic wallet; and
a third-party token service provider computer program executed by a third-party token service provider;
wherein:
the issuer computer program specifies an issuer-applied domain-specific control or an issuer-applied domain-specific restriction on a device-specific payment token for the financial instrument that is provisioned to the electronic wallet on the electronic device, wherein the device-specific payment token is restricted to transactions from only the electronic device;
the issuer computer program requests, from the third-party token service provider, generation of the device-specific payment token comprising a pass-through indicator;
the third-party token service provider computer program receives the device-specific payment token comprising the pass-through indicator;
the issuer computer program stores an association of the issuer-applied domain-specific control or restriction and the device-specific payment token;
the payment network receives a transaction request comprising the device-specific payment token that comprises the pass-through indicator;
the payment network passes the transaction to the issuer without applying the issuer-applied domain-specific control or restriction in response to the pass-through indicator;
the issuer computer program retrieves the domain control or restriction associated with the device-specific payment token; and
the issuer computer program applies the control or restriction to the transaction request.

2. The system of claim 1, wherein the pass-through indicator is a bank identification number.

3. The system of claim 1, wherein the pass-through indicator is a cryptogram parameter for the device-specific payment token.

4. The system of claim 1, wherein the domain control or restriction controls use of the device-specific payment token with a certain merchant, with a certain device, in a certain environment, at a certain time, in a certain geography, or at a certain authentication level.

5. The system of claim 1, wherein the payment network applies a payment-network level domain control or restriction on the transaction before passing the transaction to the issuer.

6. The system of claim 1, wherein the third-party token service provider is not associated with a payment network.

7. The system of claim 1, wherein the issuer-applied domain-specific control or the issuer-applied domain-specific restriction is dynamic.

8. A non-transitory computer readable storage medium, including instructions stored thereon, which when read and executed by one or more computer processors, cause the one or more computer processors to perform steps comprising:
specifying an issuer-applied domain-specific control or an issuer-applied domain-specific restriction on a device-specific payment token for a financial instrument that is provisioned to an electronic wallet on an electronic device, wherein the device-specific payment token is restricted to transactions from only the electronic device;
requesting, from a third-party token service provider, generation of the device-specific payment token comprising a pass-through indicator, wherein a payment network is configured to receive a transaction request comprising the device-specific payment token and is configured to pass the transaction request through without applying the issuer-applied domain-specific control or restriction in response to the pass-through indicator;

receiving, from the third-party token service provider, the device-specific payment token comprising the pass-through indicator;

storing an association of the issuer-applied domain-specific control or restriction and the device-specific payment token; and in response to receiving the transaction request with the device-specific payment token from the payment network, retrieving the issuer-applied domain-specific control or restriction associated with the device-specific payment token and applying the issuer-applied domain-specific control or restriction to the transaction request.

9. The non-transitory computer readable storage medium of claim 8, wherein the pass-through indicator is a bank identification number.

10. The non-transitory computer readable storage medium of claim 8, wherein the pass-through indicator is a cryptogram parameter for the device-specific payment token.

11. The non-transitory computer readable storage medium of claim 8, wherein the third-party token service provider is not associated with a payment network.

12. The non-transitory computer readable storage medium of claim 8, wherein the issuer-applied domain-specific control or the issuer-applied domain-specific restriction is dynamic.

13. The non-transitory computer readable storage medium of claim 8, wherein the issuer-applied domain-specific control or the issuer-applied domain-specific controls use of the device-specific payment token with a certain merchant, with a certain device, in a certain environment, at a certain time, in a certain geography, or at a certain authentication level.

\* \* \* \* \*